US008405883B2

(12) United States Patent
Buzzelli

(10) Patent No.: US 8,405,883 B2
(45) Date of Patent: Mar. 26, 2013

(54) DYNAMIC TRANSFER FIELD CONTROL FOR VARIATIONS IN SUBSTRATE AND ENVIRONMENT

(75) Inventor: John T. Buzzelli, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 909 days.

(21) Appl. No.: 12/509,669

(22) Filed: Jul. 27, 2009

(65) Prior Publication Data

US 2011/0019241 A1 Jan. 27, 2011

(51) Int. Cl.
*H04N 1/00* (2006.01)

(52) U.S. Cl. ......... 358/406; 358/401; 358/501; 358/504

(58) Field of Classification Search .................. 358/400, 358/401, 406, 500, 501, 504
See application file for complete search history.

(56) References Cited

U.S. PATENT DOCUMENTS

| | | | | |
|---|---|---|---|---|
| 5,294,959 | A | 3/1994 | Nagao et al. | |
| 5,307,119 | A * | 4/1994 | Folkins et al. | 399/46 |
| 5,722,009 | A | 2/1998 | Haneda et al. | |
| 5,983,044 | A | 11/1999 | Kodama et al. | |
| 2006/0222388 | A1 | 10/2006 | DiRubio et al. | |
| 2008/0003002 | A1 * | 1/2008 | Julien | 399/49 |

OTHER PUBLICATIONS

U.S. Appl. No. 12/243,575, filed Oct. 1, 2008.
International Search Report Dated Jan. 6, 2011, Issued in Connection with Related EP Application No. 10 16 9158.

* cited by examiner

*Primary Examiner* — Thomas D Lee
(74) *Attorney, Agent, or Firm* — Ronald E. Prass, Jr.; Prass LLP

(57) ABSTRACT

This invention relates to modifying built-in software in printing and copier machines. In particular, the modification will be to software relating to the transfer system control algorithms. This modification can take place when different paper, substrate, toner or environment changes. The purpose of this modification is to provide an optimum image quality when any of these conditions change.

14 Claims, 2 Drawing Sheets

DYNAMIC TRANSFER FIELD CONTROL FOR VARIATIONS IN SUBSTRATE AND ENVIRONMENT

CROSS REFERENCE

A related Xerox application identified as Ser. No. 12/243,575 filed Oct. 1, 2008 relates to control of toner transfer by measuring the transfer field to maximize toner transfer efficiency.

This invention relates to electrostatic marking systems and, more specifically, to the developer transfer step of these systems.

BACKGROUND

In an electrostatographic reproducing apparatus commonly used today, a photoconductive insulating member may be charged to a negative potential, thereafter exposed to a light image of an original document to be reproduced. The exposure discharges the photoconductive insulating surface in exposed or background areas and creates an electrostatic latent image on the member which corresponds to the image areas contained within the original document. Subsequently, the electrostatic latent image on the photoconductive insulating surface is made visible by developing the image with a developing powder referred to in the art as toner. During development, the toner particles are attracted from the carrier particles by the charge pattern of the image areas on the photoconductive insulating area to form a powder image on the photoconductive insulating area. This image may be subsequently transferred or marked onto a support surface such as copy paper to which it may be permanently affixed by heating or by the application of pressure. In some of these electrostatic marking systems, a photoreceptor belt or drum or an Intermediate Transfer Belt (ITB) is generally arranged to move in an endless path through the various processing stations of the xerographic marking process. The present invention will be described in a system where the developed image is transferred from an ITB to a substrate as selected by the user. However, a system where the transfer is from a photoconductor is also included. Substrate refers to the print medium selected by the user.

Following transfer of the toner image or marking, the substrate may be removed from the system by a user or may be automatically forwarded to a finishing station where the copies may be collected, compiled and stapled and formed into books, pamphlets or other sets. A critical portion in this xerographic process is the toner transfer step prior to fusing of the toner to the receptor or paper. This step is referred to as final transfer.

Xerographic toner transfer relies on designing control parameters that are robust to many noises. While transfer robustness can be optimized, it can never be optimized for all substrates, toners and environments. In all xerographic processes, the substrate (including paper) and the toner used are key and critical to ideal final images. Substrate characteristics that play an important part in this process are type of substrate, i.e. recycled paper, transparency, coated or non-coated, substrate water content, dielectric properties, temperature, weight in grams per square meter (GSM), etc. Each machine has built-in software or algorithms that control transfer system set points. The present invention provides a method or system to enhance these algorithm parameters to optimize image quality. In addition to differences in substrate conditions that need to be considered when providing new algorithms are toner performance and age of the machine and machine components. Machine and component age affect transfer system electrical characteristics especially for a machine using an ITB and pressure transfer system.

SUMMARY

This invention can work on any xerographic transfer machine. The key to this invention is using pre- and post-final transfer mass sensors for measuring transfer efficiency. Pre-final transfer toner mass is referred to as "DMA" and post-final transfer toner mass not transferred to the substrate and left on the ITB or OPC is referred to as "RMA". Transfer efficiency refers to the percent of transfer that gets transferred from the ITB or OPC to the substrate. A final transfer setup routine which can then allow for adjusting the control algorithm used to set transfer parameters based on optimum transfer efficiency as measured by the pre and post transfer sensors or based on the users perception. This routine can be selected to run automatically or manually as determined by the user. A closed loop final transfer control system is created when running this final transfer setup routine in automatic mode. This invention does not replace a robust transfer control built-in subsystem but is used to optimize transfer when printing on different toner, different or unusual substrates, when operating at the edges of our environment capability and with any combination of these. These situations come up quite frequently especially as more and more print companies move to recycled substrates.

Every xerographic machine today comes with built-in software that provides characteristics or algorithms which are used to determine optimum transfer system set points. These algorithms may use the following input variables: (a) machine internal environmental conditions; (b) transfer system electrical characteristics, (c) substrate characteristics, (d) image side one or side 2, (e) process speed, or (f) what print mode the machine is in either color or black only print mode. This built-in software obviously will not produce optimum images for all (a), (b), (c), (d), (e), and (f) variations such as a very humid environment, different concentration and densities of toner and various substrates other than standard paper such as transparencies, coated paper, porous paper, heavy paper, etc. Therefore, when special or different jobs are to be run with any substantial variations from (a), (b) (c), (d), (e), or (f) it is very desirable for optimum images to modify these built-in algorithms to change the transfer system set points. The present invention provides pre- and post-transfer sensors that measure the effect of (a), (b), (c), (d), (e), and (f) on transfer performance either in automatic mode (based on DMA and RMA sensor input) or a the user may select transfer parameter set points based upon the user's perception of the quality of the printed images that result from each modification.

At least one sensor is necessary to measure internal machine environmental conditions such as temperature, and humidity Software uses a transfer control algorithm with variables consisting of but not limited to data from the environmental sensor, the user programmed substrate settings (market, weight, coated or non-coated, transparency), and measurements of the transfer system electrical characteristics to adjust transfer parameters. Transfer system electrical characteristics are calculated by a routine varying the transfer high voltage power supply and monitoring its outputs. The resultant transfer parameter values as calculated by the transfer control algorithm are used until the user finds the desired and optimum resulting image. Once this is determined, new algorithm coefficients for (a), (b), (c), (d), (e), and (f) are locked into the transfer control software algorithm (modifying the built-in software) and then runs of a long job can proceed with predictable good image quality.

Measurements that can act as a reliable gauge in this invention of an improved image are the developed mass per unit area (DMA) toner immediately before final transfer and the residual mass per unit area (RMA) which is toner remaining on the photoconductor after transfer of the toner from the photoconductor or ITB to the paper or substrate. Runs can be conducted until the least RMA is present, then the algorithm is tweaked so that transfer parameter set points minimizes RMA. This modification of built-in software is especially useful in long run imaging processes such as a book or pamphlet where multiple pages of the same image are an object.

This invention uses a pre-transfer mass sensor and a post-transfer mass sensor. ETAC or ADC/ETAC, or other readily available diffuse and specular reflective sensors can be used for this purpose. For example, some current machines already have ADC sensors pre-final transfer so it would only require the addition of an ETAC or multiple ETAC sensors post-final transfer.

During the auto or closed loop mode of the final transfer setup routine, the machine runs several image patches per sheet, measure pre-final transfer mass on the image surface (ITB or OPC), measure post-final transfer residual mass area (RMA), determine percent transferred, iterate second transfer field and calculate and optimize the control parameters which provide the highest transfer efficiency.

Another user option is to run a manual final transfer setup routine which enables the user to decide what transfer field set points they like best. The setup prints different continuous tones and halftones onto the substrate. During this mode, the machine also prints on each image the transfer parameter set points used for that particular image. For example, the first sheet out might be −500V different from the nominal set point or, if running in constant current mode, might be −50 uA from nominal. The first sheet out would have "nom −500V" or "nom −50 uA" printed in the corner. The second sheet out will set final transfer to −400V or −40 uA, and so forth until 11 sheets have been printed reaching a value of nominal field +500V or 50 uA. This could also be done in larger steps of 150V or 15 uA.

The DMA sensor measures the mass entering the final transfer. The RMA sensor measures the residual mass left on the intermediate belt or OPC. Software will adjust the transfer parameter control algorithm based on the optimized transfer efficiency for this substrate (whether optimized is determined by auto mode or manual mode) and will record it along with environmental sensor data (RH and Temperature) for future reference. Software will then set final transfer field to optimize final transfer efficiency.

Thus, the present invention provides a transfer setup method (either automatic or manual) to optimize transfer efficiency to paper over transfer system electrical characteristics, environmental noises, toner and substrate variations, e.g. recycled paper or papers not on the Xerox Recommended Media List, that cannot be handled by a fixed transfer efficiency target or feed-forward calculations. The invention applies to transfer from either a photoreceptor or an intermediate transfer belt. In systems using ITB, the image is transferred from the photoconductor to the ITB and then from the ITB to the substrate. Both transfer from a photoconductor and transfer from an ITB are included within the scope of this invention. In an automatic mode, feed-forward transfer parameters would be optimized or tweaked based on a measurement (or inference) of the solid area mass prior to transfer and of the residual mass post-transfer. In a manual mode, the customer's image preferences would be incorporated into the optimization routine based on their judgment of test pattern appearance.

It is important to use in the present system, pre and post-transfer mass sensors. Reference to existing machine algorithms regarding environment, substrates and developer or toner can be starting points in developing algorithms. The present invention uses the providing of a new transfer algorithm during an auto image quality adjustment sequence or whenever the machine user requires this routine. "Transfer" as used throughout this disclosure means transfer of toner from the photoconductor or intermediate layer to the substrate or paper.

Important to this invention is that the optimized transfer field is determined based on very crucial effects of the environment, transfer system electrical characteristics, toner and the substrate and their interaction with the transfer field. All of these inputs determine how much of an image will transfer to the substrate and any image quality disturbances that may occur during the image transfer.

Many products will use algorithms to determine transfer field set points based on substrate parameters like coating and weight. These set points are optimized to perform across variations in these substrate parameters. For example, coatings used in papers may differ from one company to another chemically or in density. As well as uncoated substrates may have localized variation of dielectric thickness which is typical of some recycled paper.

Acronyms used in this disclosure and their meanings are listed below:

A. ETAC—(sensor used to measure light reflected off of toner images. The mass of the image can be determined from this information.)

B. ADC—(sensor used to measure light reflected off of toner images. The mass of the image can be determined from this information.)

C. ITB—(Intermediate Transfer Belt)

D. OP—(Optical Photo Conductor)—this can be a belt or a drum which can be charged or discharged by using light.)

E. IQ—Image Quality

F. −50 uA—negative 50 micro amps of current

G. RMA—(Residual Mass per Area)—this is the toner left behind on the OPC or ITB after transfer has occurred to the substrate; TMA—transfer mass area; DMA—developer mass area.

The toner transfer mass per unit area (TMA) is the amount of toner that is transferred from the ITB or photoreceptor to the substrate and is measured by subtracting the residual mass per unit area (RMA) from the developed mass per unit area (DMA). Therefore, DMA−RMA−TMA. It is important that the DMA be determined in order to optimize image quality. A toner TMA of 90% will generally produce a better quality image than a transfer mass area of 50%. This is one object of the present invention—to provide an algorithm that will increase the TMA of the transfer process. The present invention provides a toner transfer method or system to optimize toner transfer efficiency to paper over transfer system electrical characteristics, environmental noises, toner and substrate (paper) variations. It is important in xerographic systems to maximize transfer efficiency to provide better image quality, to reduce image quality defects associated with less than optimum toner transfer and avoid excessive toner waste. The use of improved techniques of sensing transfer system electrical characteristics, transfer efficiency, substrate information as input by the user and environment in the transfer station are all used to produce improved algorithms for optimum image quality. By "standard" paper, not substrate or system characteristics is meant throughout this disclosure and claims, the electrical and other process characteristics including characteristics of 75 gsm or similar weight non-coated paper used in many or all Xerox machines like those used in the software standards, parameters or algorithms of Xerox marking machines as manufactured.

By "significantly" reduced as it relates to RMA, is meant a reduction of 50% of residual toner after the method of this invention is conducted.

DETAILED DISCUSSION OF DRAWINGS AND PREFERRED EMBODIMENTS

Figure 1:
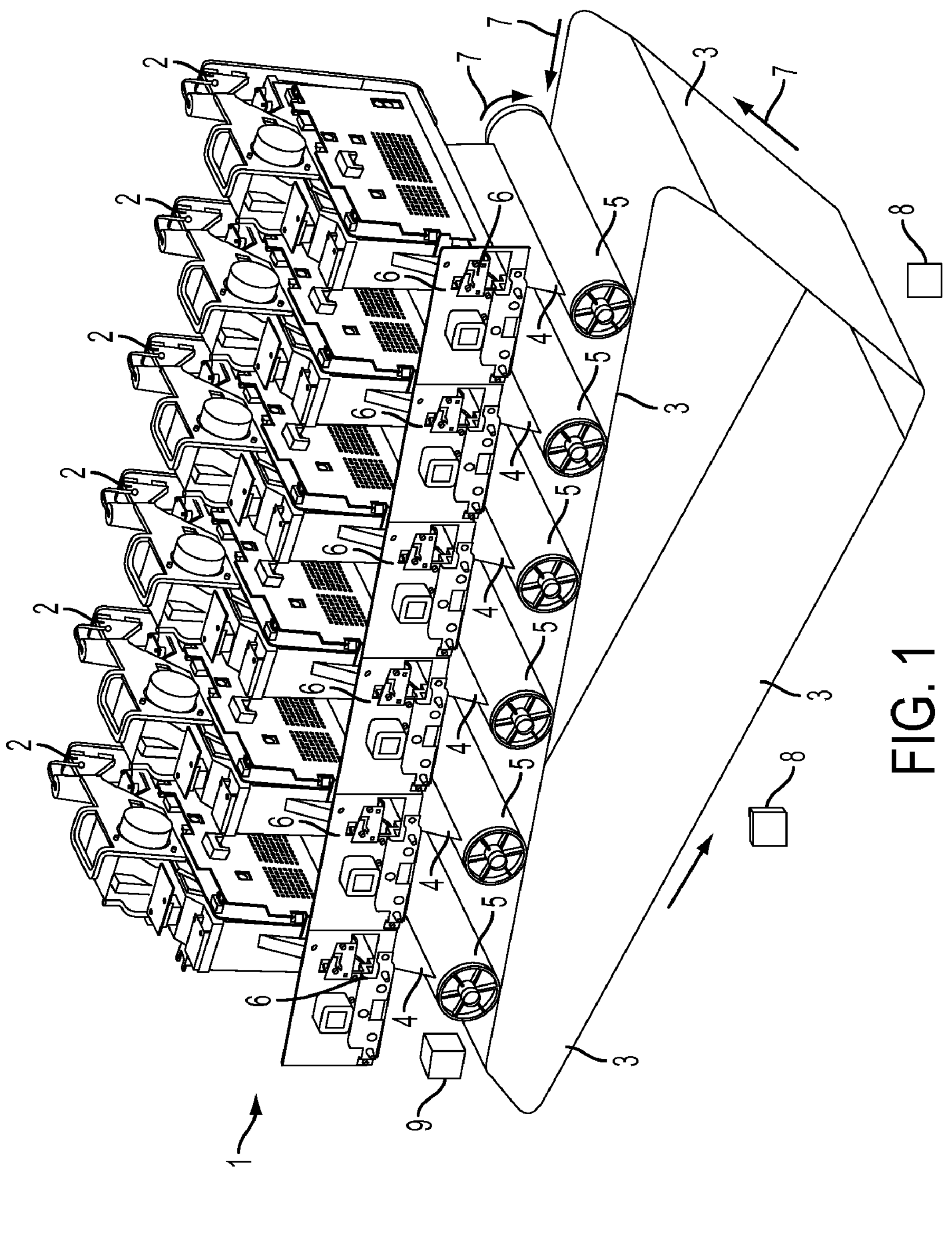
FIG. 1 illustrates a typical xerographic system using an intermediate transfer belt as it relates to the present invention.

In FIG. 1, a color-imaging system 1 where the method of transfer improvement of the present invention may be used is illustrated having an array (two or greater) of raster output scanners (ROS) 2 and their associated photoreceptor drums 5 (which include the transfer and imaging stations aligned above an endless intermediate transfer belt 3. Each ROS emits a different image beam 4 on a photoconductive drum 5 to charge the drum's surface where the image for that color will be located. The front frame 6 supports the ROS 2. As the drum 5 rotates, the charged regions pick up toner of the color for that particular imaging station and transfer this color image from the drum 5 to the surface of the belt 3 so that each colored image is deposited in relation to the previous deposited image. At the end of the process, all six deposited images (that are color developed at each station) are precisely aligned to form the color image which is formed on the belt 3 and which is eventually transferred to a substrate or media. The arrows 7 indicate the rotation direction of drum 5 and belt 3. Any number of sensors 8 and 9 may be used to measure the pre final transfer toner mass and final transfer RMA and relay this information to machine control software to adjust transfer control algorithm coefficients.

Figure 2:
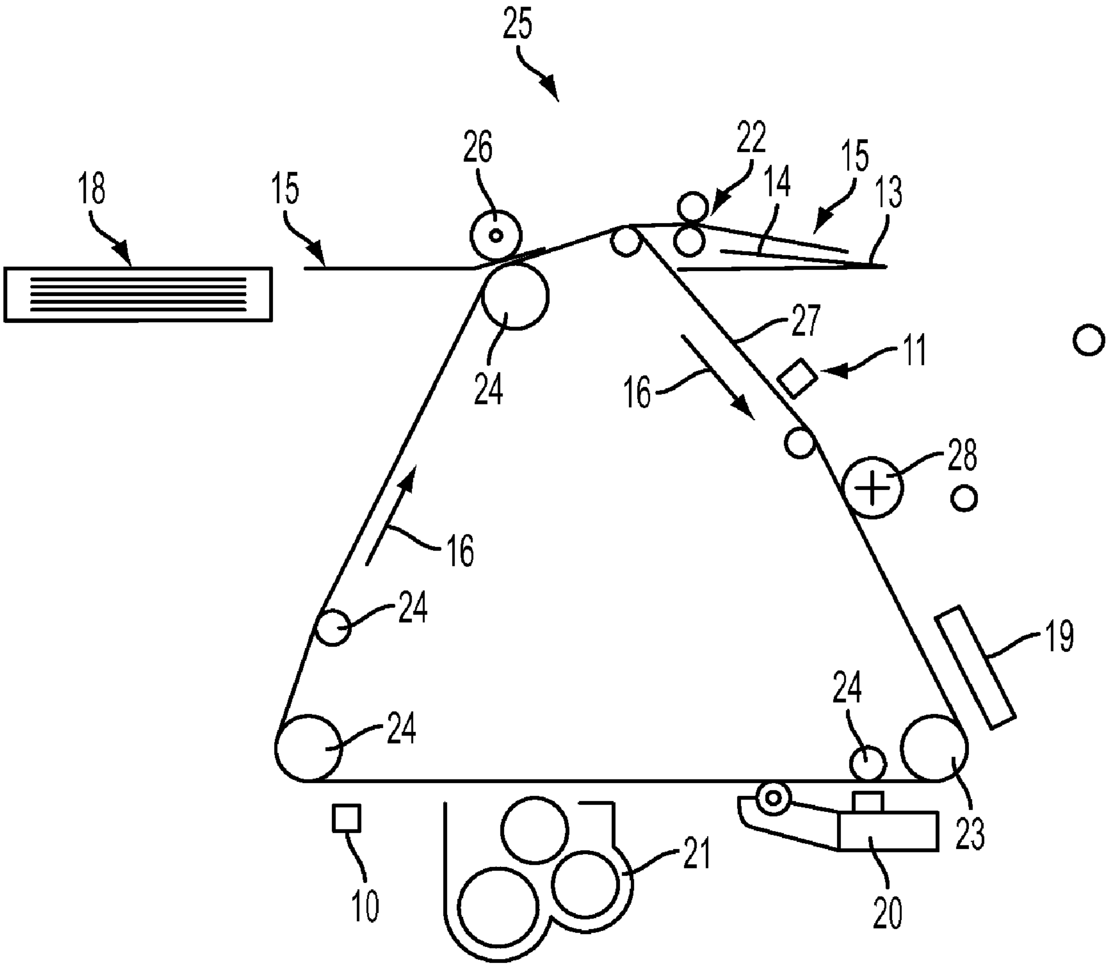
FIG. 2 illustrates a typical xerographic monochrome system using an endless photoconductive belt as it relates to the present invention.

In FIG. 2, a monochromatic, xerographic system 25 is illustrated where sensor 10 determines DMA and sensor 11 determines toner RMA. The environmental conditions, transfer system electrical characteristics, the paper or substrate characteristics, and the measurements provided by sensors 10 and 11 are factored into the existing algorithms of the machine and each tweaked to optimize transfer performance and provide more optimized characteristics and a more precise and better quality image. In FIG. 2, the xerographic system 25 contains a stacking assembly 13 at collection station 14, paper 15, arrows of photoconductor belt 27 with arrow movement 16, paper feed 18, a charging station 19, an exposure station 20, a developer station 21, a cleaning station 28 and a fusing station 22. The transfer station 26 and adjacent sensors 10 and 11 provide important measurements of transfer system electrical characteristics, DMA and RMA. Before these measurements or parameter inputs of the DMA and RMA sensors are taken and recorded, a set up or start up phase or run is conducted to determine initial transfer system electrical characteristics and environment. The transfer system electrical characteristics are then superimposed on the existing parameters of the machine software or algorithms to provide an optimum algorithm for toner transfer.

Embodiments of this invention provide a process for improving the image quality of an image produced by a xerographic machine. The process comprises determining built-in software or algorithms in the machine that relate to toner performance, transfer system electrical characteristics, substrate and environmental parameters.

The user will then conduct at least one final transfer set-up routine imaging run to determine optimum set points of the transfer system based on transfer efficiency or user preference of the printed image.

A plurality of sensors are provided to measure these conditions and subsequently when in manual mode the user determines optimum transfer parameter set points which will provide preferential image quality. Subsequently the user's preferred set point choice will be used to modify the built-in software or algorithms producing a new machine software.

All measurements of transfer system electrical characteristics, and environmental process parameters along with user selected substrate parameters are used to produce this new software. The sensors measure DMA and RMA, TMA is calculated prior to the formation of the new machine software.

Toner TMA is determined by the formula TMA=DMA−RMA. All measurements of the toner mass, transfer system electrical characteristics, and substrate and environmental parameters are entered into and stored into the machine software for future use with similar imaging processes.

Subsequently, modifying the built-in parameters or algorithms to reflect the conditions of optimum image quality in producing a new machine software is accomplished. This process can be conducted either automatically or manually.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A process for improving an image quality of an image produced by a xerographic machine, said process comprising:

determining built-in software or algorithms in said machine that relate to toner, transfer system electrical characteristics, substrate and environmental parameters, conducting at least one final transfer set-up routine imaging run to determine conditions of the toner, substrate and environmental process parameters that relate to the present desired imaging process by measuring toner DMA and RMA mass before and after image transfer to the substrate or paper being printed on, providing a plurality of sensors to measure said conditions, and subsequently modifying said built-in software or algorithms to reflect said conditions of optimum image quality in producing a new machine software.

2. The process of claim 1 wherein said sensors measurement of environmental parameters are determined at the transfer stations of said xerographic machine.

3. The process of claim 1 wherein all measurements of toner DMA and RMA, transfer system electrical characteristics, and environmental parameters, along with substrate characteristics as entered by the user are used to produce said new software.

4. The process of claim 1 wherein said sensors measure toner DMA before said transfer and toner RMA after said transfer.

5. The process of claim 1 wherein toner RMA, TMA and DMA are determined prior to said new machine software.

6. The process of claim 1 wherein toner TMA is determined by the formula TMA=DMA−RMA.

7. The process of claim 1 wherein all measurements of said toner DMA and RMA, transfer system electrical characteristics, and environmental parameters are entered into and stored into said machine software for future use with similar imaging processes.

8. A process for improving an image quality of an image produced by a xerographic machine, said process comprising:

determining built-in software or algorithms in said machine that relate to toner, substrates and environmental process parameters, and transfer system electrical characteristics, conducting at least one final transfer setup routine imaging run to determine optimum set points of the transfer system based on transfer efficiency or user preference of the printed image, providing a plurality of sensors to measure said conditions, determining what transfer system parameter set points provide optimum image quality, and subsequently modifying said built-in parameters or algorithms to reflect said conditions of optimum image quality in producing a new machine software, said process conducted either automatically or manually.

9. The process of claim 8 wherein said sensors measurement of environmental parameters are determined at the transfer stations of said xerographic machine.

10. The process of claim 8 wherein all measurements of transfer system electrical characteristics and environmental parameters, along with substrate characteristics as entered by the user are used to produce said new software.

11. The process of claim 8 wherein said sensors measure toner DMA and RMA, before and after said transfer.

12. The process of claim 8 wherein toner RMA, TMA and DMA are determined prior to said new machine software.

13. The process of claim 8 wherein toner TMA is determined by the formula TMA=DMA−RMA.

14. The process of claim 8 wherein all measurements of DMA and RMA, transfer system electrical characteristics and environmental parameters are entered into and stored into said machine software for future use with similar imaging processes.

* * * * *